United States Patent [19]
Bouvier

[11] Patent Number: 5,988,945
[45] Date of Patent: *Nov. 23, 1999

[54] METHOD FOR PREVENTING CORROSION OF THE VESSEL OF A STORAGE TANK, AND STORAGE TANK FOR IMPLEMENTING IT

[75] Inventor: Daniel Bouvier, Paris, France

[73] Assignee: Societe Melallurgique Liotard Freres, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/574,446

[22] Filed: Dec. 15, 1995

[30] Foreign Application Priority Data

Dec. 22, 1994 [FR] France .................................. 94 15474

[51] Int. Cl.$^6$ .................................................. G01M 3/40
[52] U.S. Cl. .............................. 405/54; 252/964; 73/49.3
[58] Field of Search .................................. 405/52, 53, 54; 252/964; 73/73, 49.2, 49.3

[56] References Cited

U.S. PATENT DOCUMENTS

| | | |
|---|---|---|
| 2,947,166 | 8/1960 | Palmer et al. ............................. 73/40.7 |
| 4,663,614 | 5/1987 | Rauchwerger ........................... 340/605 |
| 4,798,496 | 1/1989 | Sawada ..................................... 405/53 |
| 5,005,005 | 4/1991 | Brossia et al. ........................... 340/604 |
| 5,225,812 | 7/1993 | Faghri ..................................... 340/605 |

FOREIGN PATENT DOCUMENTS

| | | |
|---|---|---|
| 1 551 051 | 9/1967 | France . |
| 2 291 489 | 6/1976 | France . |
| 58-215520 | 12/1983 | Japan . |
| 58-219430 | 12/1983 | Japan . |
| 404 471 | 6/1966 | Switzerland . |
| 471 016 | 5/1969 | Switzerland . |

*Primary Examiner*—David Bagnell
*Assistant Examiner*—Tara L. Mayo
*Attorney, Agent, or Firm*—Westman, Champlin & Kelly, P.A.

[57] ABSTRACT

A method prevents corrosion of a vessel made of a corrodible material. The vessel has a bottom which has an outer surface. The method includes detecting the appearance of water at the outer surface of the bottom of the vessel.

19 Claims, 2 Drawing Sheets

METHOD FOR PREVENTING CORROSION OF THE VESSEL OF A STORAGE TANK, AND STORAGE TANK FOR IMPLEMENTING IT

BACKGROUND OF THE INVENTION

The present invention relates to methods for preventing corrosion of the vessel, made of a corrodible material, of a storage tank, in particular of buried storage tanks, as well as to storage tanks equipped with devices for checking the vessel which use these methods.

Methods and devices are known for leak detection in a storage tank. For example the French Patent No. 1,551,051 which describes a vessel which includes an inner skin, a liquid-presence detector being arranged on the inner surface of the bottom of the vessel. This type of device exhibits the drawback, on the one hand, of not protecting the outer surface of the vessel from corrosion resulting from the moisture outside the vessel and, on the other hand, does not make it possible to detect the appearance of water as soon as it occurs in the intermediate space. The document Patent Abstract of Japan, Vol. 8 Number 68 (page 264) of 30 Mar. 1984, also describes a. vessel surrounded by a concrete wall, a recess having been formed in the gap between the concrete wall and the vessel, in which a water detector is arranged. However, this device exhibits the drawback of not warning the user of the appearance of moisture as soon as it appears, but, as in the case of the device described in French Patent No. 1,551,051, only after a certain time during which the corrosion may already have progressed too far.

A method is known for checking the good condition of the vessel of a buried storage tank, which consists in observing the appearance of corrosion on the outer wall of the vessel by using a camera, the images from which are sent to a monitor which is not buried. This method of the prior art exhibits the drawbacks, on the one hand, of being very expensive and, on the other hand, of not giving a warning until after corrosion has occurred.

SUMMARY OF THE INVENTION

The invention alleviates the drawbacks of the prior art via a method for preventing corrosion of the vessel of a storage tank which, while being much less complicated to implement than the prior method, makes it possible to warn the user even before corrosion of the storage tank appears, and thus makes it possible to preserve the storage tank for a virtually unlimited lifetime.

According to the invention, the method includes in detecting the appearance of water which condenses on a part of the outer surface of the bottom of the vessel. It has now been understood that, when the vessel contains a cold liquid, for example liquefied petroleum gas, the appearance of water which has condensed is a forewarning of corrosion. By attending to the vessel as soon as this warning appears, there is a better chance of keeping the vessel in good condition than if attention were deferred until the corrosion had become a leak. However, it is on the outer surface of the bottom of the vessel where moisture will first appear, as it is there that the temperature is lowest.

An improvement to the method includes, on the one hand, in encasing the outer surface of the bottom of the vessel or a part of this surface with a leaktight casing which, with the outer surface of the bottom of the vessel, or a part of this surface, defines a leaktight enclosure which is filled, via an inlet situated on the casing, with an anhydrous fluid (air, nitrogen or the like) and, on the other hand, in checking the possible appearance of water on the part of the outer surface of the bottom of the vessel. The outer surface is thus exposed to a medium such that it should normally be impossible for moisture to appear there, the cause of the appearance of water, a forewarning of corrosion, and there is an effective check that water is not appearing. If, however, the leaktightness of the casing should be faulty, and moisture succeeds in entering the enclosure which is supposed to be leaktight, action can be taken before corrosion sets in. This method makes it possible to translate the phenomenon of future corrosion into an appearance of water, which can be measured by a simple physical quantity such as an electric current.

The invention also envisages a storage tank having a vessel made of a corrodible material, steel for example, and having a bottom and a casing made of a non-corrodible material surrounding at least the bottom of the vessel, defining a leaktight enclosure between it and the bottom of the vessel, a detector of the presence of water being mounted on the outer surface of the bottom of the vessel.

The casing may be a non-corrodible material and may be less pressure resistant than the vessel. It is particularly made of plastic.

In order, in the atmosphere of the enclosure, to measure a moisture content which is extremely low, due to the very low temperatures which the storage tank reaches by reason of the evaporation of the liquefied gas which it contains, an improvement to the invention consists in filling the leaktight enclosure with an anhydrous fluid (air, nitrogen for example), thus making it possible to protect the outer surface of the vessel from the ambient moisture in the leaktight enclosure. Anhydrous fluid is understood to mean a fluid which contains no liquid water, and the water vapour content of which is too low for condensation to occur.

In order to be able to measure traces of moisture, the detector of the storage tank according to the invention may consist of a layer of hygroscopic salt (chloride, nitrate, sulphate of alkaline metal or the like), which is fixed onto the outer surface of the vessel by a known fixing means (adhesive, crimping, etc) and with which two electrodes, made of a rustproof material (gold, platinum or the like) or plated with a material of this type, are placed in close contact at a distance from one another.

The hygroscopic salt has very low conductivity in crystallized form, which becomes much greater when it is in solution. Electric current cannot pass between the two electrodes as long as the hygroscopic salt is in crystallized form. When condensation water appears, the salt dissolves and current can pass between the two electrodes.

By linking the electrodes, by two conductors, to an information means including an electric circuit comprising an electrical current source and a means of detecting the passage of the current, it is possible to know that condensation water has appeared.

Generally, the vessel of a storage tank is made of a corrodible material which conducts electricity. For current not to be able to pass between the electrodes via the vessel of the storage tank, it is necessary to ensure, when the electrodes are mounted in close contact with the layer of salt, that this layer of salt completely insulates the electrodes from the outer surface of the vessel.

An improvement to the detector of a storage tank according to the invention consists in placing a heat-conducting but electrically insulating membrane between the outer surface of the vessel and the layer of salt. This membrane makes it possible to provide for the electrical insulation of the electrodes with respect to the outer surface of the vessel, while providing thermal conduction which ensures that the layer of salt is at a temperature equal to that of the outer surface of the vessel.

An improvement to the detector consists in placing a removable fixing piece, particularly a magnet, between this membrane and the outer surface of the vessel.

By virtue of this magnet, the detector can easily be mounted under the vessel simply by sticking the magnet, which then supports the detector, against the vessel. Likewise, the detector can be withdrawn from the vessel simply by moving the magnet away from the storage tank.

In practice, it is convenient to have access easily to the data supplied by the detector, despite the fact that detection is performed within the leaktight casing, preferably under the very bottom of the vessel, which is itself buried.

An improvement to the invention makes it possible to resolve this problem by placing the information means outside the leaktight enclosure, in such a way that it is easily accessible by the user.

In order to enhance the resolution of the detector even further, that is to say to enhance the minimum quantity of water necessary for a current to be visible on the means of detecting the passage of current, according to an improvement of the invention, a means intended to amplify the current which passes through the electrodes when the salt becomes conducting is added to the electric circuit.

According to one embodiment of the invention, this amplification means includes a transistor (of 2 N 222 type, for example), the base of which is linked to an electrode, while the branch consisting of the electric current source and of the means of detecting the passage of the current is mounted between the collector and the emitter, the collector also being linked to the other electrode. Thus, when a current enters the base of the transistor, it emerges therefrom amplified via the emitter before passing into the current passage detector.

According to an improvement of the invention, the detector is equipped with a means of memory storage of the fact that current has passed between the electrodes and that, therefore, water has appeared on the outer surface of the vessel.

This memory storage allows the user of the storage tank to be informed that water has appeared at a given moment without having to consult the information means at this precise moment. This memory-storage means is particularly useful in the case in which the detector detects water appearing although the user is not in the process of reading the information and although, before the user reads the information, this water disappears.

The electrical circuit of an embodiment of a detector equipped with such a memory-storage means consists of a tripole, for example a transistor, having the property that, if current enters via a first pole, the dipole consisting of the second and third poles is conducting and that, if current does not enter via the first pole, the dipole is not conducting, the first pole being linked to an electrode, one pole of the second and third poles being linked to the other electrode, of a memory-storage switch controlled by the current, initially in open position and which passes into closed position when current leaves the pole of the tripole which is not linked to an electrode, of an electric current source and of a current passage detection means, the pole of the tripole not linked to an electrode being linked to one of the electric current source terminals and to one of the terminals of the switch, the other terminal of the switch being linked to the means of detecting the passage of current, which is itself linked to the pole of the dipole which is linked to an electrode and to the other electric current source terminal.

In this layout, the memory storage means consists of the memory-storage switch controlled by the current. The lamp serving as a means of detecting the passage of the current then remains continuously illuminated, being supplied by the electric current source.

In practice, the electric current source will rapidly discharge, if it is left thus continuously on load. If this discharge takes place before the user reads the information, the lamp will be extinguished due to this discharge, and he will wrongly conclude that the storage tank is operating appropriately.

In order to protect the electric current source from such a discharge, an improvement to the invention consists in placing, in the electrical circuit, a means intended to prevent the electric current source supplying current immediately after a current has been detected.

An embodiment of the electrical circuit equipped with such a means is as follows: it consists of a tripole, for example a transistor, having the property that, if current enters via a first pole, the dipole consisting of the second and third poles is conducting and that, if current does not enter via the first pole, the dipole is not conducting, the first pole being linked to an electrode, one pole of the second and third poles being linked to the other electrode, of a memory-storage switch excited by the current, initially in open position and which passes to closed position when current leaves the pole of the tripole which is not linked to an electrode, of an electric current source and of a current passage detection means, the pole of the tripole not linked to an electrode being linked to one of the electric current source terminals and to one of the terminals of the switch, the other terminal of the switch being linked to the means of detecting the passage of current, itself linked to the pole of the dipole which is linked to an electrode and to the other electric current source terminal, a non-supply switch with two positions, open and closed, initially in closed position and which passes to open position when it is excited by current being mounted between the pole of the tripole which is not linked to an electrode and the input of the first two-position switch controlled by the current and a manual switch controlling the passage of the current in the means of detecting the passage of current.

By virtue of this layout, the electric current source supplies current only during the very short period of time between the moment when the salt becomes conducting and the moment when the memory-storage switch opens.

The advantage of this layout is that, after water condensation has been detected, the current source no longer supplies current but the user is nevertheless informed that water has appeared during his absence. This is because the memory-storage switch controlled by the current has actually closed and, when the user closes the manual switch, the electric current source again feeds into the current passage detection means and warns the user that current has passed in the circuit during his absence.

Another embodiment includes in replacing the two switches excited by the current by a bistable relay with two branches, each branch having two open and closed positions, the first being initially in closed position and the second initially in open position, and the first opening and the second closing when the current enters the bistable relay.

Thus, when the salt becomes conducting, current enters the memory-storage switch excited by the current (the branch of the relay), which is initially closed, which has the effect of opening it, whereas the second switch (the second branch) closes.

It can also happen that the detector becomes detached from the outer surface of the vessel.

An improvement to the detector of the storage tank according to the invention consists in equipping this detector with a means indicating the fact that it has become detached from the vessel.

An embodiment of a detector equipped with such an indicator means comprises,- as indicator means, a switch with a spring tensioned between the outer surface of the vessel and an end stop integral with the detector, and conductors linking it to each electrode.

Hence when the detector and its integral end stop move away from the surface of the vessel, the spring-type switch relaxes and closes so as to allow current to pass. Everything then happens as if the detector had detected an appearance of water, and the user is warned by the means of detecting the passage of the current that an anomaly has appeared in the detector.

When the detector does not detect anything, this may be because no water condensation appears, but also because the information means is defective.

In order to supply the user with a signal warning him of an anomaly in the information means, an improvement to the storage tank according to the invention consists in two conductors linked to the outside of the leaktight casing by a verification switch, and each linked, within the casing, to one of the electrodes. This makes it possible, when the verification switch is closed, to make it seem that water is appearing on the outer surface of the vessel and thus to verify that the information means is operating normally. If such is not the case, the user knows that an anomaly exists and that attention is necessary.

A variant of a storage tank comprising a device for warning the user that an anomaly is impeding its correct operation consists of a detector which comprises a hygroscopic salt, two electrodes linked together by a resistor, of value less than that constituted by the undissolved salt and greater than that constituted by the dissolved salt, and preferably a sheath made of synthetic material chosen for its properties of high water absorption and low water desorption. A non-limiting example of an appropriate material is a polyamide (nylon type).

When condensation occurs on the outer surface of the vessel of the storage tank, the condensed water easily penetrates the material of the sheath and alters the resistance of the hygroscopic salt, bringing it to a value less than that of the resistor placed between the two electrodes. In this way, observation of the presence of condensation can be verified by a simple resistance measurement.

Three cases can arise:
1) the value of the overall resistance is greater than that of the resistor placed in series with the electrodes: the apparatus is faulty, as a consequence of a break in circuit,
2) the value of the overall resistance corresponds to that of the resistor placed in series with the electrodes: the sensor is operating and there has been no condensation;
3) the value of the overall resistance is less than that of the resistor placed in series: there has been condensation.

A simple ohmmeter allows checking both of the circuit and of the presence of condensation.

BRIEF DESCRIPTION OF THE DRAWINGS

In the attached drawing given solely by way of example.

DETAILED DESCRIPTION OF THE PREFERRED EMBODIMENTS

Figure 1:
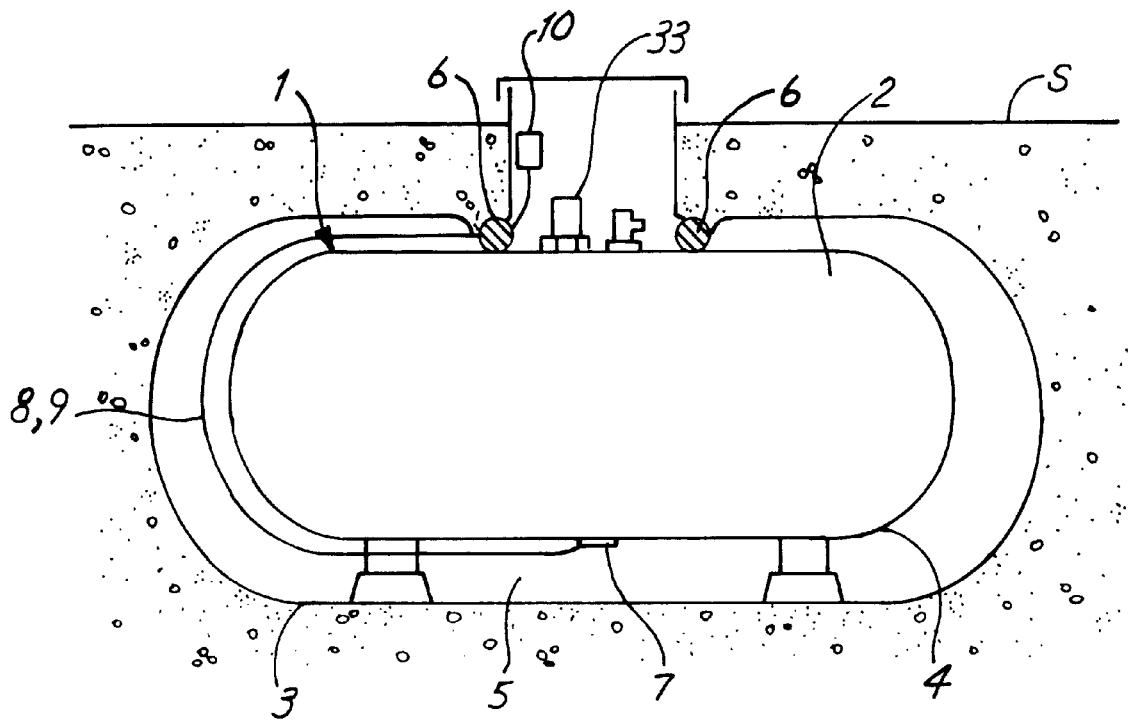
FIG. 1 is a diagrammatic view in section of a storage tank according to the invention.

The storage tank represented in FIG. 1 is designated overall by the reference 1. It includes a vessel 2 made of steel surrounded by a casing 3 made of a non-corrodible material, for example a plastic, such as polyethylene, which, with the outer surface 4 of the vessel 2, defines a leaktight enclosure 5 the leaktightness of which is ensured by sealing joints 6. An inlet (not represented), equipped with a stopper, makes it possible to introduce anhydrous fluid or gas into the enclosure 5.

Under the bottom of the vessel 2, is mounted a detector 7 of the appearance of water linked by conductors 8, 9 to an information means 10 making it possible to know whether the detector 7 has detected condensation. This information means 10 is easily accessible to the user of the storage tank, being close to the surface of the ground S.

Figure 2:
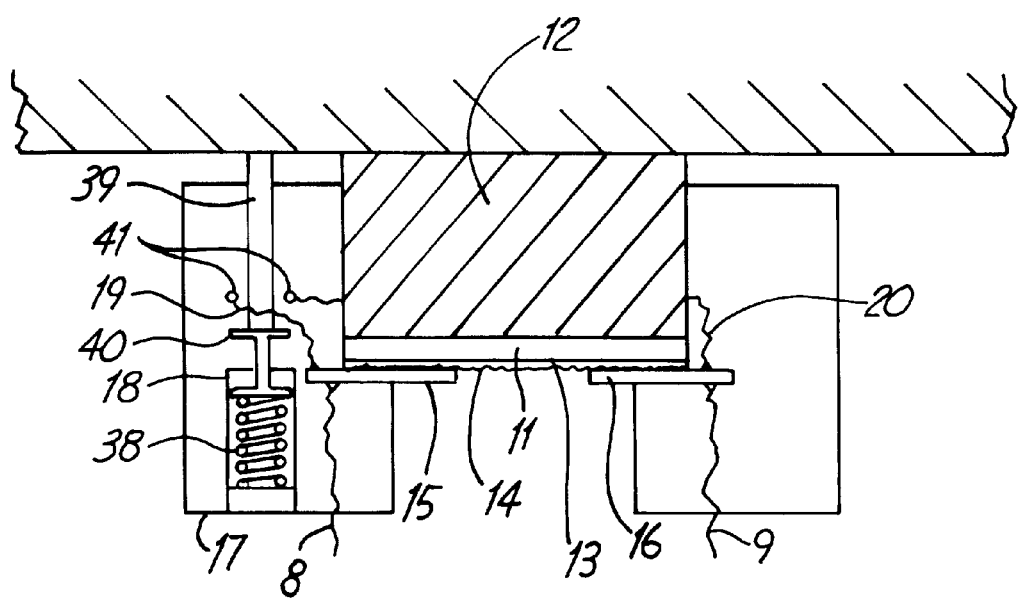
FIG. 2 is a diagrammatic view in section of a preferred embodiment of the detector according to the invention.
Figure 3:
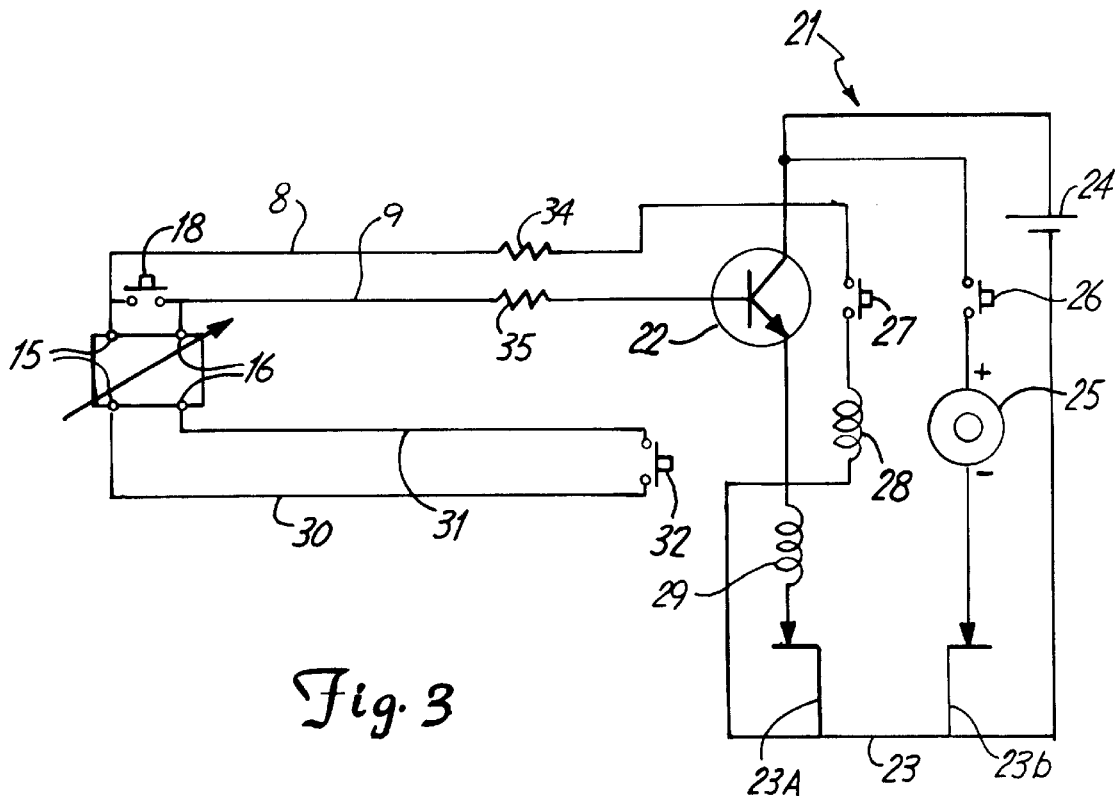
FIG. 3 is a diagram of a preferred embodiment of the electrical circuit of the storage tank according to the invention, corresponding to the part which is outside the leaktight casing.

The detector (FIG. 2) consists of a membrane 11, electrically insulating and thermally conducting, for example SILPAD 400 manufactured by the BERGQUIST company, one of the faces of which is in permanent contact with the outer surface 4 of the vessel by means of a thermally conducting magnet 12, while the other face 13 is covered by a layer 14 of hygroscopic salt (LiCl, NaCl or the like), the conductivity of which in solution is much greater than in crystallized form. In this layer are mounted two electrodes 15, 16 made of a rustproof material (gold, platinum or the like), arranged in close contact with the face 13 of the membrane 11. A plastic box 17 covers over the inner part of the enclosure of the detector in order to protect the layer of hygroscopic salt, and can serve as a reserve of hygroscopic salt.

A spring-type switch 18 has its spring 38 mounted compressed between the bottom of the box 17 forming an end stop and the outer surface 4 of the vessel, with the interposition of a pusher 39 equipped with a blade 40. When the spring 38 is relaxed because the bottom 17 moves away from the surface 4, the conducting blade 40 comes into contact with two terminals 41, and is linked by two conductors 19, 20 to each of the electrodes. Two conductors 8, 9 link the electrodes to the information means 10 after having passed through the leaktight casing 3 via sealed orifices.

This information means 10 comprises an electrical circuit 21 connected to the terminals of the conductors 8, 9 coming from the electrodes.

The conductor 8 is linked to the base of a transistor 22, the emitter of which is linked to a first branch 23a of a bistable relay 23 with two positions NC and NO. This bistable relay branch 23a is linked by a wire, on the one hand, to a terminal of an electric current source 24 and, on the other hand, to the second branch of the bistable relay 23b with two positions NC and NO. The latter is linked by a wire to a lamp 25, serving as a means for detecting the passage of a current, the lamp itself being linked to a manual switch 26 itself linked to the collector of the transistor 22. The second electric current source terminal of source 24 is also linked to the collector of the transistor 22. A branch comprising a zero-reset switch 27 and an auxiliary coil 28 is mounted between the electric current source terminal which is also linked to the bistable relay 23. The coil 29 forms part of the bistable relay 23.

Two other conductors 30, 31 are mounted at the terminals of the electrodes 15, 16 and linked, after having passed through the casing 3 in a leaktight way, by a verification switch 32.

The liquid or gas to be stored in the vessel of the storage tank, for example a liquefied petroleum gas, is introduced via an inlet 33, and a gas or an anhydrous fluid is introduced into the leaktight enclosure 5. The leaktightness of the enclosure 5 makes it possible to ensure that the outer surface 4 of the vessel 2 is never exposed to a moist atmosphere, which protects it against corrosion. If, nonetheless, moisture succeeds in getting into the enclosure 5, then, by reason of the low temperature of the liquefied petroleum gas which is in the lower part of the inside of the vessel, it will happen that condensation water will appear on the outer surface of the vessel, and in particular in the bottom of the vessel where the temperature is lowest. This appearance of water is detected by the water appearance detector 7. Via the conductors 8, 9, the information that water has been detected is sent to the lamp 25 which allows the user to know that attention is necessary in order to avoid future corrosion of the vessel 2.

Under normal conditions (no appearance of water), the conductivity of the hygroscopic salt between the two electrodes 15, 16 is very low and no current passes in the conductors 8, 9, all the more so as two high-value resistors 34, 35 are mounted in series respectively with each electrode.

If water appears on the layer 14 of salt of the detector 7, its conductivity increases greatly and a flow of current ensues, which enters the base of the transistor 22. The current emerges amplified from the emitter of the transistor and enters the first branch 23A, with two bistable states, of the bistable relay which then passes from the NC (closed) state, which allows the current to pass, to the NO (open) state which prevents the current passing. The current which has just passed into the first branch of the bistable relay also enters the second branch 23B of the bistable relay which itself passes from the NO state to the NC state. The circuit consisting of the electric current source 24, of the lamp 25 and of the manual switch 26 is then closed, and current passes through the lamp 25 if the switch 26 is closed. The user, by closing this switch 26, is then informed:

if the lamp lights, then current has passed between the electrodes since the last time the bistable relay 23 was in the normal position (branch A closed, branch B open), (generally the last inspection);

if the lamp does not light and lights when he closes the verification switch 32, then no current has flowed since the last time the bistable relay was set to normal position.

The switch 32 short-circuits the electrodes and allows current to pass between them. By closing it, the user can then verify that the information means 10 is operating normally, if the lamp lights. If it does not light, it is because a fault exists in the information means 10 (defective cable, defective components, etc) and attention is required thereto.

Once these checks have been carried out, the user reopens the manual switch 26 and closes the zero-reset switch 27 for a brief moment, which resets the bistable relay into its normal position, by supplying power to the auxiliary coil 29 of the relay.

By virtue of the switch 26 and of the branch 23a, the electric current source is not loaded throughout the whole time between the instant when water appeared and the instant when the user carries out his operations. This makes it possible, from then on, to ensure a very long lifetime for the battery.

When the user closes the switch 26 and when the lamp lights, this signals an anomaly. Condensation has been able to occur, as was described above. Another cause is that the detector 7 has become detached from the surface of the vessel 2. This is because, if this should occur, the spring-type switch 18 has its spring decompressed, thus bringing the switch to the closed position. Current then passes between the two electrodes and it applies voltage to the lamp 25 in the same way as if condensation had appeared.

Hence, when upon pressing on the switch 26, the user sees the lamp 25 light, he knows that attention is necessary in the leaktight enclosure in order either to dry out the enclosure, or to refix the detector to the vessel.

Figure 4:
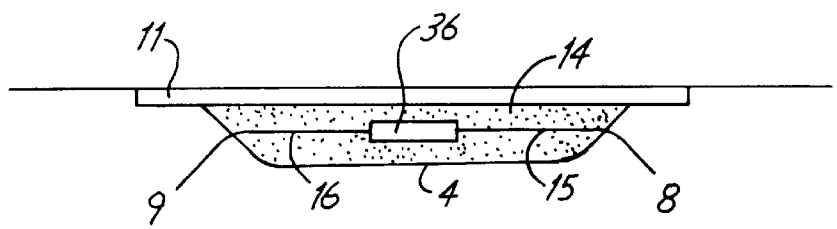
FIG. 4 is a diagram of another possible embodiment of the detector.

In FIG. 4, a resistor 36 is mounted between the electrodes (15, 16) in the hygroscopic salt 14 within a sheath 37 made of a material which strongly absorbs water and has low desorption.

When condensation occurs on the outer surface of the vessel of the storage tank, the condensed water easily penetrates the material of the sheath and alters the resistance of the hygroscopic salt, bringing it to a value less than that of the resistor 36. In this way, observation of the presence of condensation can be verified by a simple resistance measurement.

Three cases can occur:
1) the value of the overall resistance is greater than that of the resistor 36: the detector 7 is defective following a break in circuit, etc.
2) the value of the overall resistance corresponds to that of the resistor 36: the detector 7 is operating and there has been no condensation.
3) the value of the overall resistance is less than that of the resistor 36: there has been condensation.

I claim:

1. A method for forewarning future corrosion of a vessel made of a corrodible material and having a bottom which has an outer surface, at least a portion of the outer surface being surrounded with a leaktight casing so that the outer surface and the casing define a leaktight enclosure, the method comprising:

detecting an initial condensation of water at the outer surface of the bottom of the vessel.

2. A method according to claim 1, and further comprising:
placing the outer surface of the bottom of the vessel in an anhydrous atmosphere.

3. A storage tank comprising:
a vessel made of a corrodible material and having a bottom which has an outer surface;
a leak-tight casing surrounding at least a portion of the outer surface, defining a leak-tight enclosure between the casing and the vessel; and
a detector of condensation of water mounted directly on the outer surface of the bottom of the vessel and adapted to detect condensation of water on the outer surface.

4. A storage tank according to claim 3, in which the detector is fixed to the outer surface of the bottom of the vessel by a removable fixing piece.

5. A storage tank according to claim 3, in which the detector works together with a means to provide information intended to give information of the fact that the detector is detecting the appearance of water.

6. A storage tank according to claim 5, in which the means to provide information comprises a means for memory-storage of the fact that the detector has detected an appearance of water.

7. A storage tank according to claim 5, further comprising a means for verifying the correct operation of the means to provide information.

8. A storage tank according to claim 7, in which the verification means comprises two conductors each starting from an electrode and of a verification switch mounted between the two conductors, or of a resistor mounted in series between the electrodes.

9. A storage tank according to claim 3, in which the detector includes a layer of hygroscopic salt, the conductivity of which in solution is much greater than in crystallized form, in a heat-exchange relation with the outer surface of the bottom of the vessel, two electrodes at a distance from one another, each electrode being in contact with the layer of hygroscopic salt, and two conductors with each conductor linked to a respective one of the two electrodes.

10. A storage tank according to claim 9, in which a membrane made of an electrically insulating but thermally conducting material is fixed to a part of the outer surface of the vessel, between the outer surface of the vessel and the layer of salt, the layer of salt being fixed to the membrane.

11. A storage tank according to claim 10, further comprising a means to provide information including an electrical circuit, linked to each of the electrodes by the conductors, the electrical circuit including an electric current source and a means of detecting the passage of the current.

12. A storage tank according to claim 11, in which the electrical circuit comprises a means of amplifying the electric current.

13. A storage tank according to claim 11, in which the electrical circuit of the means to provide information comprises, as memory-storage means, a means for remembering that current has passed therein, the electrical circuit consisting of a tripole, such that if current enters via a first pole, a dipole consisting of the second and third poles is conducting and that, if no current enters via the first pole, the bipole is not conducting, in which the first pole is linked to an electrode, one pole of the second and third poles is linked to the other electrode, of a memory-storage switch with two positions, closed and open, which allows and does not allow current to pass respectively, initially in the open position and which passes to the closed position when a current leaves the pole of the triple which is not linked to an electrode, of an electric current source and of a means of detecting the passage of the current, the pole of the triple which is not linked to an electrode being linked to one of the terminals of the electric current source and to one of the terminals of the switch, the other terminal of the switch being linked to the means of detecting the passage of current, itself linked to the pole of the dipole which is linked to an electrode and to the other terminals of the electric current source.

14. A storage tank according to claim 11, in which a means intended to prevent the electric current source from supplying current after the detector has detected an appearance of water is mounted on the electrical circuit.

15. A storage tank according to claim 14, in which the electrical circuit also comprises a second non-supply, two-position switch, controllable by the current, initially in closed position and passing to open position when a current leaves the pole of the triple which is not linked to an electrode, mounted between the pole of the triple which is not linked to an electrode and the input of the first two-position switch, and a switch controlling the passage of the current in the means of detecting the passage of current.

16. A storage tank according to claim 3, in which a means is provided for indicating that the detector is no longer in a heat-exchange relation with the outer surface of the vessel.

17. A storage tank according to claim 16, in which the means indicating that the detector is no longer in a heat-exchange relation consists of a switch, linked to the electrodes by two conductors, which is closed when the detector moves away from the cuter surface of the vessel.

18. A storage tank according to claim 3, in which the enclosure is filled with an anhydrous fluid.

19. The storage tank of claim 3, wherein the detector of condensation comprises a layer of hygroscopic salt which is fixed onto the outer surface of the bottom of the vessel.

* * * * *